(12) United States Patent
Kubota

(10) Patent No.: US 9,366,175 B2
(45) Date of Patent: Jun. 14, 2016

(54) MUFFLER AND METHOD OF MANUFACTURING THE MUFFLER

(71) Applicant: SANKEI GIKEN KOGYO CO., LTD., Tokyo (JP)

(72) Inventor: Naoya Kubota, Isesaki (JP)

(73) Assignee: SANKEI GIKEN KOGYO CO., LTD., Tokyo (JP)

( * ) Notice: Subject to any disclaimer, the term of this patent is extended or adjusted under 35 U.S.C. 154(b) by 0 days.

(21) Appl. No.: 14/434,237

(22) PCT Filed: Feb. 18, 2014

(86) PCT No.: PCT/JP2014/000814
§ 371 (c)(1),
(2) Date: Apr. 8, 2015

(87) PCT Pub. No.: WO2014/162651
PCT Pub. Date: Oct. 9, 2014

(65) Prior Publication Data
US 2015/0260078 A1 Sep. 17, 2015

(30) Foreign Application Priority Data

Apr. 3, 2013 (JP) .................................. 2013-077697

(51) Int. Cl.
*F01N 13/18* (2010.01)
*F01N 13/00* (2010.01)

(52) U.S. Cl.
CPC .......... *F01N 13/1838* (2013.01); *B23K 26/244* (2015.10); *F01N 13/1872* (2013.01);
(Continued)

(58) Field of Classification Search
CPC . F01N 13/1838; F01N 13/18; F01N 13/1872; F01N 13/1888; F01N 13/1894

USPC ......................... 181/282, 249, 255; 29/890.08
See application file for complete search history.

(56) References Cited

U.S. PATENT DOCUMENTS

| 4,111,278 A | * | 9/1978 | Bergman | ................ F01N 1/089 |
| | | | | 181/249 |
| 5,545,860 A | * | 8/1996 | Wilkes | ............... B60H 1/00507 |
| | | | | 181/255 |

(Continued)

FOREIGN PATENT DOCUMENTS

| JP | 2005-153015 A | 6/2005 |
| JP | 2005-319482 A | 11/2005 |

(Continued)

OTHER PUBLICATIONS

International Search Report dated May 20, 2014 issued in corresponding application No. PCT/JP2014/000814.

*Primary Examiner* — Edgardo San Martin
(74) *Attorney, Agent, or Firm* — Westerman, Hattori, Daniels & Adrian, LLP

(57) ABSTRACT

A muffler has a first flared part provided at an opening end portion of an upper half body of a muffler shell. A flange is provided at a tip of a peripheral wall extending substantially vertically and belonging to the first flared part. The flange is bent to project outwardly. A second flared part is provided at the opening end portion of the lower half body of the shell. A peripheral wall of the second flared part is press fitted inside the peripheral wall of the first flared part to fit into the peripheral wall so as to extend substantially along the peripheral wall. A part of the peripheral wall of the first flared part and a part of the peripheral wall of the second flared part that fit into each other are laser welded along their entire peripheries, thereby forming a welded part.

10 Claims, 6 Drawing Sheets

(52) U.S. Cl.
CPC ....... *F01N13/1888* (2013.01); *B23K 2201/006* (2013.01); *B23K 2201/12* (2013.01); *B23K 2201/18* (2013.01); *F01N 2450/22* (2013.01); *Y10T 29/49398* (2015.01)

(56) References Cited

U.S. PATENT DOCUMENTS

| | | | |
|---|---|---|---|
| 7,866,044 B2* | 1/2011 | Nakano | B21D 39/04 29/451 |
| 7,942,240 B2 | 5/2011 | Olsen | |
| 2008/0066998 A1* | 3/2008 | Hara | F01N 13/085 181/212 |
| 2008/0277016 A1* | 11/2008 | Covers | F01N 13/1811 138/155 |
| 2015/0008068 A1* | 1/2015 | Hamashima | F01N 13/1888 181/228 |

FOREIGN PATENT DOCUMENTS

| | | |
|---|---|---|
| JP | 2005-342756 A | 12/2005 |
| JP | 2007-16636 A | 1/2007 |
| JP | 2010-270764 A | 12/2010 |

* cited by examiner

MUFFLER AND METHOD OF MANUFACTURING THE MUFFLER

TECHNICAL FIELD

This invention relates to a muffler having a shell formed by welding and a method of manufacturing the muffler.

BACKGROUND ART

A conventionally known muffler has a shell provided by forming metallic half bodies by performing deep-drawing press molding on metallic plates and welding these metallic half bodies. As an example, the muffler of patent literature 1 has a shell provided by forming flared parts at respective opening end portions of two closed-end cylinders resulting from deep-drawing press molding on metallic plates, forming a reverse-tapered opening part having a tip tapered so as to extend outwardly by press molding at the flared part of one of the closed-end cylindrical bodies, forming a forward-tapered opening part having a tip tapered so as to become narrower toward the inside by press molding at the flared part of the other closed-end cylinder, inserting the flared part with the forward-tapered opening part into the flared part with the reverse-tapered opening part so as to make a fit therebetween, and laser welding overlapping parts.

This shell has the flared parts formed by press molding at the respective opening end portions of the two closed-end cylinders. This increases dimension accuracy of the parts fitting into each other. Further, the flared part with the forward-tapered opening part is inserted into the flared part with the reverse-tapered opening part so as to make a fit therebetween. This minimizes a gap between the parts when fitted into each other to ensure a connection formed by laser welding.

A muffler of patent literature 2 has a shell provided by forming a flared part by expanding an opening end portion in diameter of one of two closed-end cylinders resulting from deep-drawing press molding on metallic plates, forming a flange at an opening end portion of the other closed-end cylinder while applying wrinkle holding force and then reducing this opening end portion in diameter so as to remove a residual wrinkle, inserting the opening end portion of the other closed-end cylinder reduced in diameter into the flared part of the former closed-end cylinder so as to make a fit therebetween, and laser welding the overlapping parts.

According to the muffler of patent literature 2, the opening end portion of the other closed-end cylinder is reduced in diameter. This allows the opening end portion of the other closed-end cylinder to be inserted easily into the flared part of the former closed-end cylinder while eliminating a wrinkle from the opening end portion of the other closed-end cylinder. As a result, a gap between the parts fitting into each other is minimized to ensure a connection formed by laser welding.

PRIOR ART LITERATURES

Patent Literatures

Patent Literature 1: Japanese Patent Application Publication No. 2005-319482 (see FIG. 5)
Patent Literature 2: Japanese Patent Application Publication No. 2005-342756

SUMMARY OF INVENTION

Problem to be Solved by Invention

According to the mufflers of patent literatures 1 and 2, the flared part with the forward-tapered opening part is inserted into the flared part with the reverse-tapered opening part so as to make a fit therebetween, or the opening end portion reduced in diameter is inserted into the flared part. This minimizes a gap between the parts when fitted into each other and makes it possible to ensure a connection formed by laser welding. Meanwhile, a different configuration capable of achieving a comparable effect has been desired in terms of diversity of technology.

Additionally, according to the muffler of patent literature 1, forming the flared parts by press molding at both the opening end portions of the two closed-end cylinders to fit into each other involves the following. After both the flared parts are formed by press molding, each of the flared parts is further subjected to press molding with a conical punch and a die with a conical recess to form the reverse-tapered opening part and the forward-tapered opening part. This requires press molding to be performed many times, leading to low manufacturing efficiency. According to the muffler of patent literature 2, during formation of the opening end portion of the other closed-end cylinder, the flange formed by deep-drawing press molding is trimmed and press molding is performed such that the opening end portion becomes the same in diameter as the body of the cylinder. Then, the opening end portion is reduced in diameter. This also causes the problem of low efficiency of a manufacturing step.

This invention is suggested in view of the aforementioned problem. It is an object of this invention to provide a muffler and a method of manufacturing the muffler that, when a shell is formed by making a fit between metallic finished articles and welding the finished articles, is capable of ensuring that a connection is formed by laser welding by suppressing a gap between parts fitting into each other, aims for high efficiency of a manufacturing step, and diversifies technology.

Solution to Problem

A muffler of this invention has a shell formed by making a fit between respective opening end portions of metallic finished articles each having a peripheral wall extending in a standing position from a peripheral edge of a substrate and welding the finished articles. The shell is characterized as follows. A flared part is provided at the opening end portion of a first finished article. A flange is provided at a tip of a peripheral wall extending substantially vertically and belonging to the flared part. The flange is bent to project outwardly. A peripheral wall is provided at the opening end portion of a second finished article by cutting a portion including a tip formed by press molding. The peripheral wall at the opening end portion of the second finished article is press fitted inside the peripheral wall of the flared part of the first finished article to fit into the peripheral wall of the flared part so as to extend substantially along the peripheral wall of the flared part. A part of the peripheral wall of the flared part of the first finished article and a part of the peripheral wall at the opening end portion of the second finished article that are fitted into each other are laser welded along their entire peripheries.

According to this configuration, a portion including the tip formed by press molding is cut and a part that suffers from a wrinkle is removed, thereby forming the peripheral wall at the opening end portion of the second finished article. Further, this peripheral wall is press fitted inside the peripheral wall extending substantially vertically and belonging to the flared part to fit into the peripheral wall of the flared part so as to extend substantially along the peripheral wall of the flared part. This can minimize the occurrence of a gap between the parts fitted into each other. As a result, the parts fitted into each other can be connected reliably by laser welding. Further, by the presence of the bent portion at a tip of the flared part leading to the flange, the peripheral wall at the opening end portion of the second finished article can be press fitted smoothly inside the peripheral wall of the flared part. Additionally, the peripheral wall at the opening end portion of the second finished article is not required to be subjected to additional press molding or complicated processes such as a process for reducing diameter performed in stages. As a result, the muffler or the shell of the muffler can be manufactured by an efficient step. Additionally, with a novel configuration completely different from existing technology, a gap between the parts fitting into each other is suppressed to achieve the effect of ensuring a connection formed by laser welding. This contributes to the diversity of technology.

The muffler of this invention is characterized in that the flared part provided to the first finished article is a first flared part, a second flared part is provided at the opening end portion of the second finished article, and the peripheral wall at the opening end portion of the second finished article forms a peripheral wall of the second flared part.

According to this configuration, the flared parts to become the parts to fit into each other are provided by press molding or the like to both the first and second finished articles. This can increase dimension accuracy of the parts fitting into each other.

The muffler of this invention is characterized in that the first finished article is an upper half body and the second finished article is a lower half body.

According to this configuration, the presence of the flared part and the flange extending throughout a peripheral edge of the upper half body can prevent retention of rainwater in the part where the upper half body and the lower half fit into each other, for example. As a result, the muffler or the shell of the muffler can be provided with enhanced resistance to corrosion and enhanced durability.

The muffler of this invention is characterized in that the flange is formed into a tapered pattern so as to expand further toward its tip in a direction of the fit.

This configuration can reduce the amount of projection of the flange to the side, thereby allowing placement of the muffler in smaller space. Further, this configuration can reduce air colliding with the flange, thereby allowing reduction in air resistance under the floor.

A method of manufacturing a muffler of this invention includes: a first step of forming a metallic first finished article and a second finished article, the first finished article having a peripheral wall extending in a standing position from a peripheral edge of a substrate and a flared part and a flange provided at an opening end portion formed by performing at least press molding on a metallic plate, the flange projecting outwardly from a tip of a peripheral wall extending substantially vertically and belonging to the flared part, the second finished article having a peripheral wall extending in a standing position from a peripheral edge of a substrate and a peripheral wall tending to expand toward its tip and provided at an opening end portion formed by performing press molding on a metallic plate and cutting a portion including a tip formed by press molding; a second step of press fitting the peripheral wall tending to expand toward its tip and provided at the opening end portion of the second finished article inside the peripheral wall of the flared part of the first finished article, thereby making the peripheral wall that tends to expand toward its tip fit into the peripheral wall of the flared part so as to extend substantially along the peripheral wall of the flared part; and a third step of laser welding a part of the peripheral wall of the flared part of the first finished article and a part of the peripheral wall tending to expand toward its tip and provided at the opening end portion of the second finished article fitting into each other along their entire peripheries, thereby forming a shell.

According to this configuration, a portion including the tip formed by press molding is cut and a part that suffers from a wrinkle is removed, thereby forming the peripheral wall tending to expand toward its tip at the opening end portion of the second finished article. Further, this peripheral wall tending to expand toward its tip is press fitted inside the peripheral wall extending substantially vertically and belonging to the flared part to fit into the peripheral wall of the flared part so as to extend substantially along the peripheral wall of the flared part. This can minimize the occurrence of a gap between the parts fitting into each other. As a result, the parts fitting into each other can be connected reliably by laser welding. Further, by the presence of the bent portion at a tip of the flared part leading to the flange, the peripheral wall at the opening end portion of the second finished article can be press fitted smoothly inside the peripheral wall of the flared part. Additionally, the peripheral wall at the opening end portion of the second finished article is not required to be subjected to additional press molding or complicated processes such as a process for reducing a diameter performed in stages. As a result, the muffler or the shell of the muffler can be manufactured by an efficient step. Additionally, with a novel configuration completely different from existing technology, a gap between the parts fitted into each other is suppressed to achieve the effect of ensuring a connection formed by laser welding. This contributes to the diversity of technology.

The method of manufacturing a muffler of this invention is characterized in that the first finished article formed in the first step has a first flared part corresponding to the flared part, and the second finished article is formed in the first step by forming a second flared part having a peripheral wall tending to expand toward its tip at the opening end portion.

According to this configuration, the flared parts to become the parts to fit into each other are provided by press molding or the like to both the first and second finished articles. This can increase dimension accuracy of the parts fitting into each other.

Advantageous Effects of Invention

This invention is capable of ensuring that, when a shell is formed by making a fit between metallic finished articles and welding the finished articles, a connection is formed by laser welding by suppressing a gap between parts fitting into each other, aims for high efficiency of a manufacturing step, and diversifies technology.

DESCRIPTION OF EMBODIMENTS

[Muffler and Method of Manufacturing the Muffler According to Embodiment]

Figure 1:
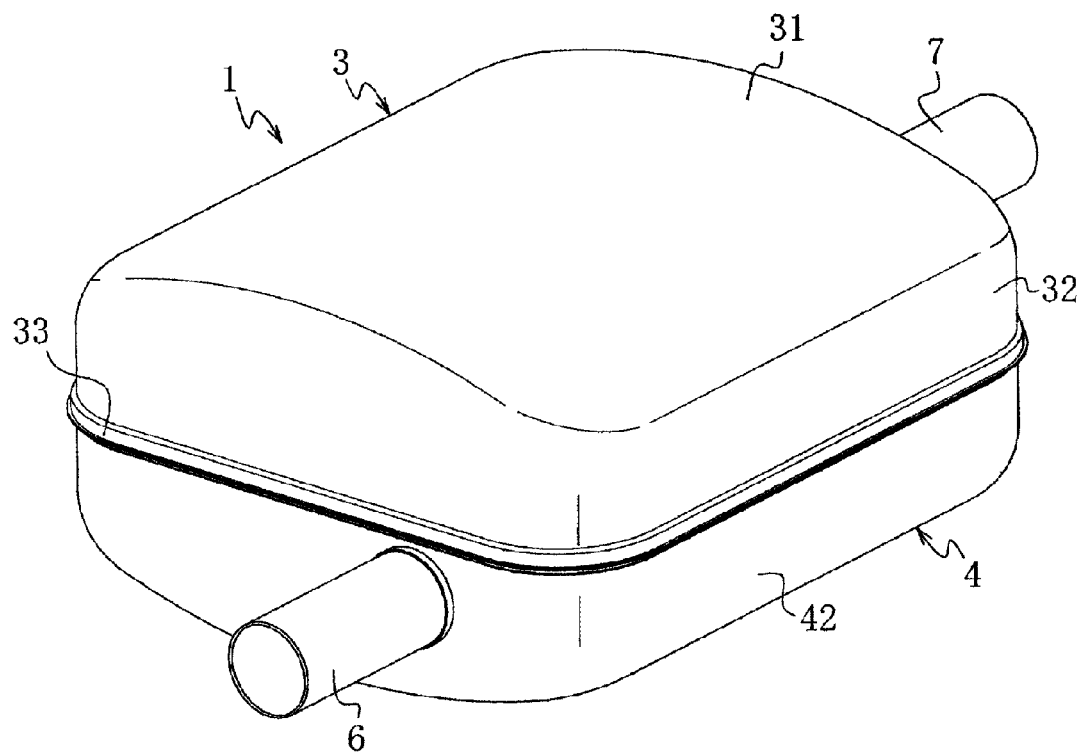
FIG. 1 is a perspective view showing a muffler of an embodiment.
Figure 2:
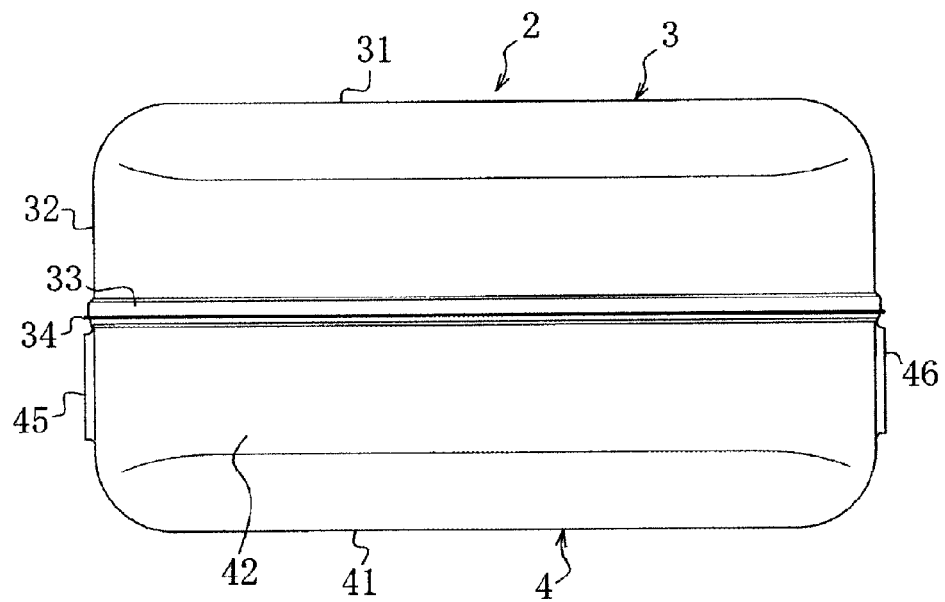
FIG. 2 is a side view showing a shell of the muffler of the embodiment.

As shown in FIGS. 1 and 2, a muffler 1 of an embodiment has a shell 2. The shell 2 is formed by making a fit between an opening end portion of an upper half body 3 as a metallic finished article shaped like a rectangular box and an opening end portion of a lower half body 4 as a metallic finished article shaped like a rectangular box and welding the upper half body 3 and the lower half body 4.

Figure 3:
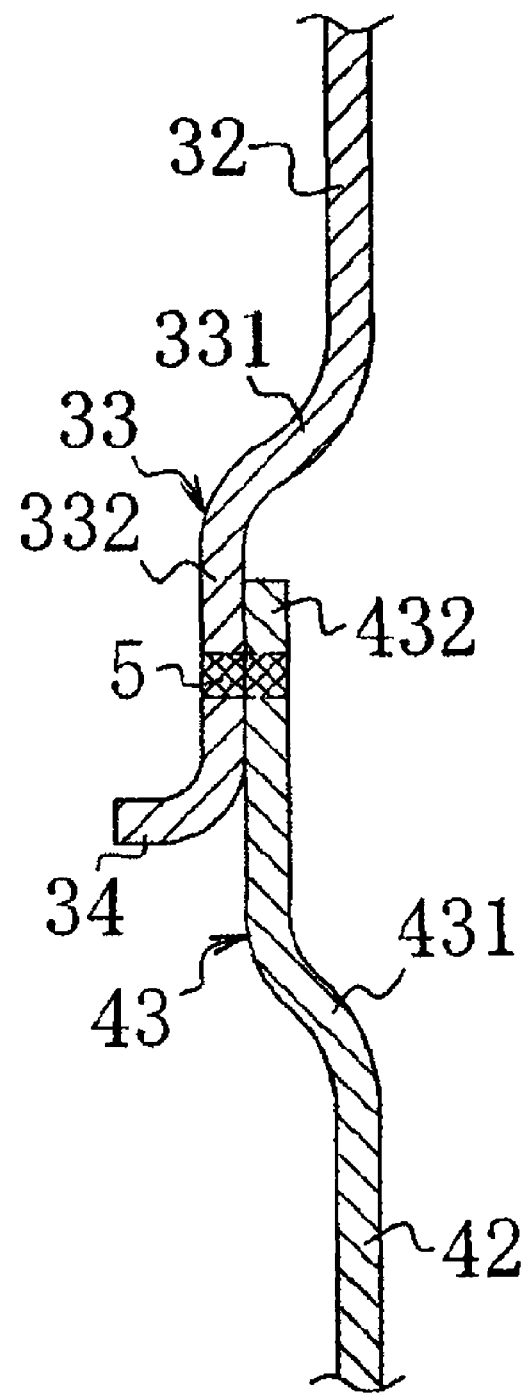
FIG. 3 is a partial sectional view showing parts and their vicinities of the shell fitting into each other of the shell in the muffler of the embodiment.

As shown in FIGS. 1 to 3, the upper half body 3 has a substrate 31 and a peripheral wall 32 extending in a standing position from a peripheral edge of the substrate 31. A first flared part 33 is provided at an opening end portion of the peripheral wall 32. The first flared part 33 is formed of a jutting part 331 continuous with the peripheral wall 32 and bent to project outwardly, and a peripheral wall 332 continuous with a tip of the jutting part 331 and bent to extend substantially vertically. A flange 34 continuous with a tip of the peripheral wall 332 of the first flared part 33 is further provided so as to be bent to project outwardly. The bent portion from the peripheral wall 332 to the flange 34 is curved with some roundness.

As shown in FIGS. 1 to 3, the lower half body 4 has a substrate 41 and a peripheral wall 42 extending in a standing position from a peripheral edge of the substrate 41. A second flared part 43 is provided at an opening end portion of the peripheral wall 42. The second flared part 43 is formed of a jutting part 431 continuous with the peripheral wall 42 and bent to project outwardly and a peripheral wall 432 continuous with a tip of the jutting part 431 and bent to extend in a straight line substantially along the peripheral wall 332. The peripheral wall 432 is formed by cutting a portion of a semi-finished article including its tip formed by press molding. This cutting removes a portion to suffer from a wrinkle, specifically an extended portion of the peripheral wall 432.

The outer size of the peripheral wall 432 of the lower half body 4 is the same as or slightly smaller than the inner size of the peripheral wall 332 of the upper half body 3. The peripheral wall 432 of the second flared part 43 is press fitted inside the peripheral wall 332 extending substantially vertically and belonging to the first flared part 33 to fit into the peripheral wall 332 so as to extend substantially along the peripheral wall 332. A part of the peripheral wall 332 of the first flared part 33 and a part of the peripheral wall 432 of the second flared part 43 that overlap and fit into each other are laser welded along their entire peripheries along the peripheral flared parts 33 and 43, thereby forming a welded part 5 formed as a result of the laser welding.

Side walls of the peripheral wall 42 of the lower half body 4 facing each other are provided with a through hole 45 and a through hole 46. An inlet pipe 6 and an outlet pipe 7 are provided so as to penetrate the through holes 45 and 46, thereby forming the muffler 1.

Figure 4:
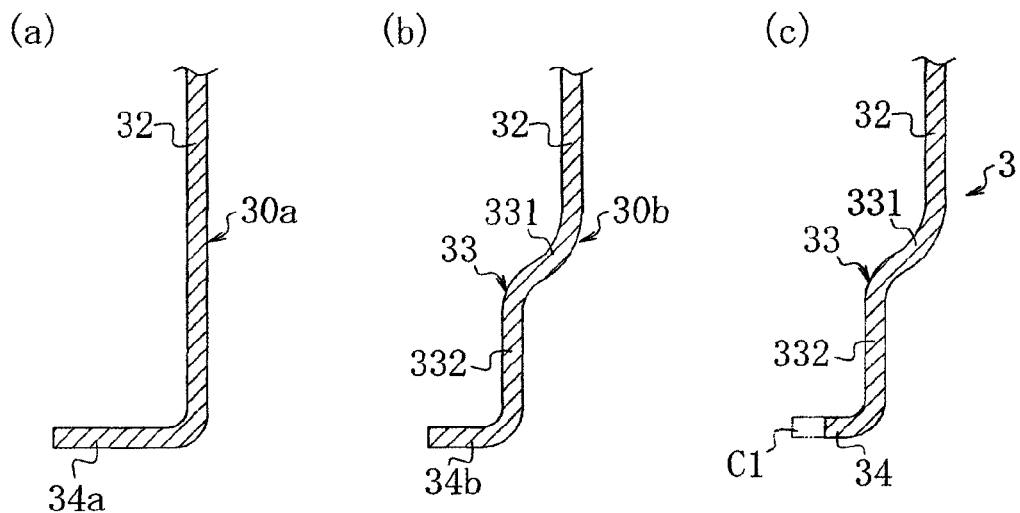
FIGS. 4(a) to 4(c) are partial sectional views each showing an opening end portion and its vicinity of an upper half body at a corresponding stage of manufacture.

To form the shell 2 in a manufacturing step of the muffler 1 of this embodiment, a flat metallic plate is subjected to deep-drawing press molding with a die and a punch to form a first semi-finished article 30a to become the upper half body 3. The first semi-finished article 30a has a shape including the substrate 31, the peripheral wall 32 extending in a standing position in a substantially vertical direction relative to the substrate 31, and a semi-finished flange 34a continuous with the top edge of the peripheral wall 32 and bent toward an outer periphery at substantially right angles (see FIG. 4(a)). The vertical direction illustrated in FIG. 4 is opposite to that determined in actual press molding.

A flat metallic plate is subjected to deep-drawing press molding with a die and a punch to form a second semi-finished article 40a to become the lower half body 4. The second semi-finished article 40a has a shape including the substrate 41, the peripheral wall 42 extending in a standing position in a substantially vertical direction relative to the substrate 41, and a semi-finished flange 44a continuous with the top edge of the peripheral wall 42 and bent toward an outer periphery at substantially right angles (see FIG. 5(a)).

As shown in FIG. 4(b), regarding the first semi-finished article 30a, an opening end portion of the first semi-finished article 30a is thereafter subjected to press molding with a different stepped die and a punch of an outer size larger than that of the punch used in the former step. This forms the first flared part 33 with the jutting part 331 and the peripheral wall 332 extending substantially vertically while simultaneously forming a semi-finished flange 34b shorter than the semi-finished flange 34a, thereby obtaining a first semi-finished article 30b.

Figure 5:
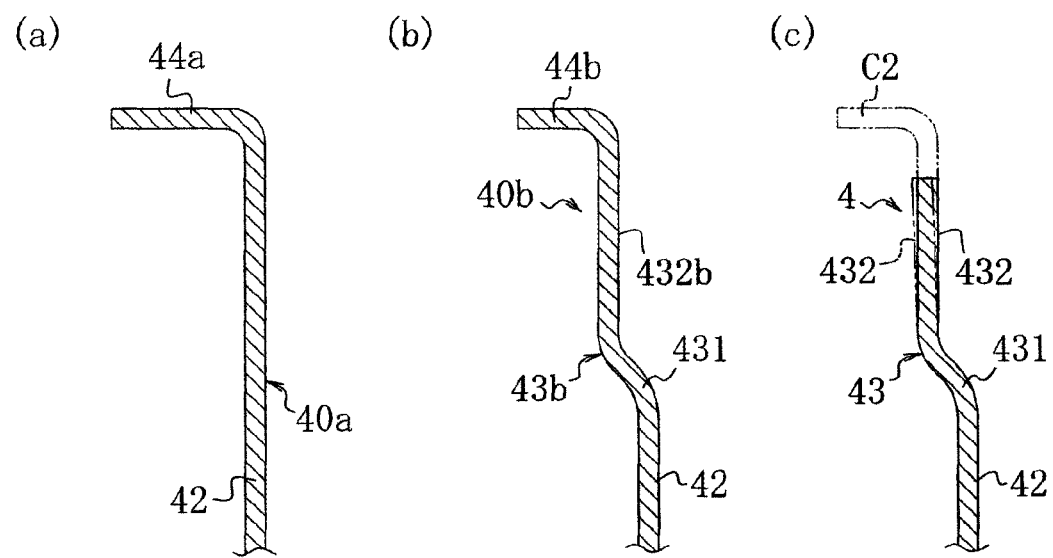
FIGS. 5(a) to 5(c) are partial sectional views each showing an opening end portion and its vicinity of a lower half body at a corresponding stage of manufacture.

Further, as shown in FIG. 5(b), regarding the second semi-finished article 30b, an opening end portion of the second semi-finished article 40a is subjected to press molding with a different stepped die and a punch of an outer size larger than that of the punch used in the former step. This forms a second flared part 43b with the jutting part 431 and a peripheral wall 432b extending substantially vertically while simultaneously forming a semi-finished flange 44b shorter than the semi-finished flange 44a, thereby obtaining a second semi-finished article 40b. The first and second flared parts 33 and 43b are formed into respective sizes that allow the peripheral wall 432b to be press fitted inside the peripheral wall 332.

If the upper half body 3 and the lower half body 4 are relatively shallow, for example, one press molding may be performed as an alternative to the steps of FIGS. 4(a) and 4(b) to form the first semi-finished article 30b out of a metallic plate without going through the state of the first semi-finished article 30a, or one press molding may be performed as an alternative to the steps of FIGS. 5(a) and 5(b) to form the second semi-finished article 40b out of a metallic plate without going through the state of the second semi-finished article 40a. In some cases, both of these alternatives can be adopted.

As shown in FIG. 4(c), regarding the first semi-finished article 30b, the semi-finished flange 34b is partially cut thereafter by press molding or the like to form the flange 34 of a given length from which a cut C1 is removed, thereby obtaining the upper half body 3. Further, as shown in FIG. 5(c), the second semi-finished article 40b is cut by press molding or the like in a position in the middle of the peripheral wall 432b of the second semi-finished article 40b to form the peripheral wall 432 from which a cut C2 including the semi-finished flange 44b and some portion of the peripheral wall 432b is removed, thereby obtaining the lower half body 4.

In this case, regarding the peripheral wall 332 of the first flared part 33, the bent portion at the tip of the peripheral wall 332 and the peripheral wall 332 are biased inwardly by the flange 34 provided at the tip of the peripheral wall 332 so as to project outwardly. This stabilizes the shape of the peripheral wall 332 extending substantially vertically. In contrast, the peripheral wall 432 of the second flared part 43 of the lower half body 4 without a site corresponding to the flange 34 has a shape that is to extend in a straight line. Meanwhile, as shown by alternate long and two short dashed lines in FIG. 5(c), the peripheral wall 432 tends to expand slightly toward its tip rather than extending vertically. As described later, this shape allows the peripheral wall 432 to be deformed so as to eliminate the expansion toward its tip when the peripheral wall 432 is press fitted inside the peripheral wall 332. Additionally, the portion of the peripheral wall 432b closer to the tip than the peripheral wall 432 and that suffers from a wrinkle is removed at the cut C2.

Figure 6:
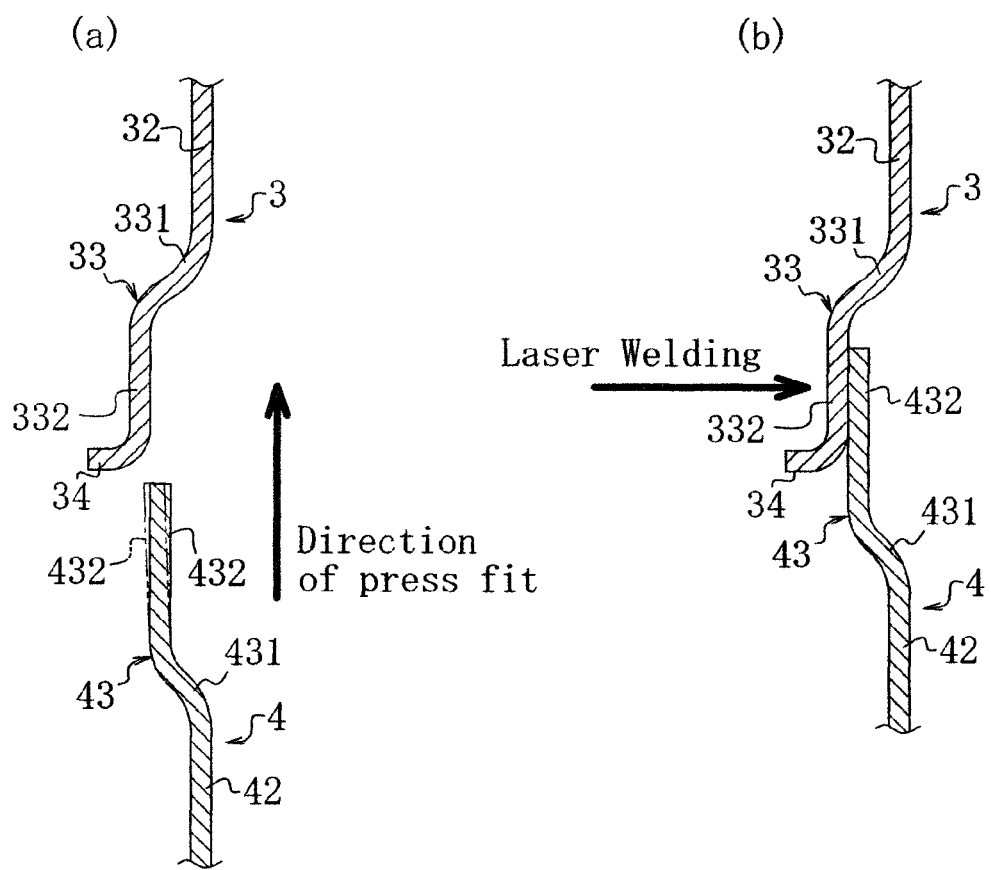
FIG. 6(a) is a partial sectional explanatory view of flared parts and their vicinities explaining how the lower half body is press fitted to the upper half body and FIG. 6(b) is a partial sectional explanatory view of the respective flared parts and their vicinities of the upper half body and the lower half body fitting into each other.

Next, as shown in FIG. 6, the peripheral wall 432 tending to expand toward its tip and belonging to the second flared part 43 of the lower half body 4 is press fitted inside the peripheral wall 332 of the first flared part 33 of the upper half body 3 to fit into the peripheral wall 332 so as to extend substantially along the peripheral wall 332. Further, a part of the peripheral wall 332 of the first flared part 33 and a part of the peripheral wall 432 of the second flared part 43 fitted into each other are laser welded along their entire peripheries. As a result of this laser welding, the shell 2 with the welded part 5 of FIG. 3 is completed.

According to this embodiment, a portion including the tip formed by press molding is cut and a part that suffers from a wrinkle is removed, thereby forming the peripheral wall 432 at the opening end portion of the lower half body 4. Further, the peripheral wall 432 tending to expand toward its tip is press fitted inside the peripheral wall 332 extending substantially vertically and belonging to the flared part 33 to fit into the peripheral wall 332 so as to extend substantially along the peripheral wall 332. This makes the bent portion from the peripheral wall 332 to the flange 34 and the peripheral wall 332 inwardly press the expansion of the peripheral wall 432 toward its tip. As a result, the parts fitting into each other can contact each other more tightly through active use of the expansion of the peripheral wall 432 toward its tip. This can minimize the occurrence of a gap between the parts fitted into each other, so that the parts fitted into each other can be connected reliably by laser welding.

By the presence of the bent portion at the tip of the first flared part 33 leading to the flange 34, the peripheral wall 432 tending to expand toward its tip and belonging to the second flared part 43 is moved along the bent portion. This allows the peripheral wall 432 at the opening end portion of the lower half body 4 to be press fitted smoothly inside the peripheral wall 332 of the first flared part 33. Additionally, the peripheral wall 432 at the opening end portion of the lower half body 4 is not required to be subjected to additional press molding or complicated processes such as a process for reducing a diameter performed in stages. As a result, the muffler or the shell of the muffler can be manufactured by an efficient step. Additionally, with a novel configuration completely different from existing technology, a gap between the parts that are fitted into each other is suppressed to achieve the effect of ensuring a connection formed by laser welding. This contributes to the diversity of technology.

The flared parts 33 and 43 to become the parts to fit into each other are provided by press molding or the like to the upper half body 3 and the lower half body 4 respectively. This can increase dimension accuracy of the parts fitting into each other. Additionally, the first flared part 33 and the flange 34 extending throughout a peripheral edge of the upper half body 3 are provided so as to cover from above the parts of the upper half body 3 and the lower half body 4 that fit into each other. This can prevent retention of rainwater in the parts of the upper half body 3 and the lower half and 4 that fit into each other, for example. Thus, the muffler 1 and the shell 2 of the muffler 1 can be provided with enhanced resistance to corrosion and enhanced durability.

[Modifications of Embodiment and Others]

The invention disclosed in this specification includes, in addition to the configurations according to respective inventions or embodiments, in an applicable range, a matter defined by modifying any of these partial configurations into other configurations disclosed in this specification, a matter defined by adding any other configurations disclosed in this specification to these partial configurations, or a matter defined into a generic concept by cancelling any of these partial configurations within a limit that achieves a partial operational advantage. The invention disclosed in this specification further includes the following modifications.

As an example, the shell 2 of the aforementioned embodiment is configured such that the upper half body 3 and the lower half body 4 fit into each other vertically. Meanwhile, this invention includes an appropriate configuration of forming a shell by making a fit between respective opening end portions of metallic finished articles each having a peripheral wall extending in a standing position from a peripheral edge of a substrate and welding the finished articles. This configuration for example includes a configuration of making a fit between half bodies as a first finished article and a second finished article and welding these half bodies in a lateral direction such as a longitudinal direction or a horizontal direction.

Through holes for letting the inlet pipe 6 and the outlet pipe 7 pass through can be arranged in any appropriate positions within a range of the substance of this invention. As an example, both the through holes for letting the inlet pipe 6 and the outlet pipe 7 pass through may be formed in the upper half body 3. Alternatively, one of these through holes may be formed in the upper half body 3 and the other through hole may be formed in the lower half body 4.

According to the aforementioned embodiment, the peripheral wall 432 of the second flared part 43 tends to expand toward its tip. However, this is not construed as a limitation. This invention further includes the peripheral wall 432 of the second flared part 43 without the tendency to expand toward its tip as long as such a peripheral wall 432 can be press fitted inside the peripheral wall 332 of the first flared part 33 to fit into the peripheral wall 332 so as to extend substantially along the peripheral wall 332. Additionally, the substrates 31 and 41 of the upper half body 3 and the lower half body 4 respectively are not limited to a flat plate shape and may include plates of any appropriate shape. As an example, the substrates 31 and 41 may have a shape with a recess formed in the center. Further, the peripheral walls 32 and 42 extending in a standing position from the substrates 31 and 41 respectively do not always extend in a substantially vertical direction. As an example, the peripheral walls 32 and 42 may alternatively extend in a tapered pattern so as to expand toward respective openings, where appropriate.

Figure 7:
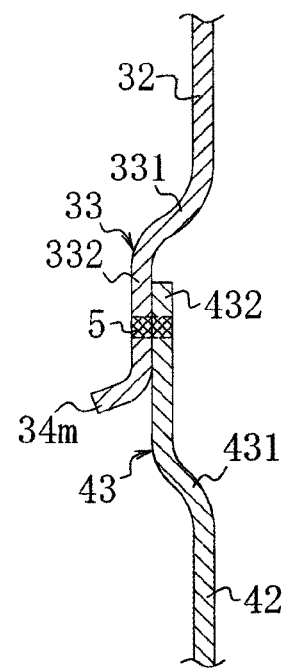
FIG. 7 is a partial sectional view showing parts fitting into each other and their vicinities of a shell in a muffler of a modification.

The flange 34 of the aforementioned embodiment is continuous with the tip of the peripheral wall 332 of the first flared part 33 and bent at substantially right angles to project outwardly. Meanwhile, a flange of this invention can be determined appropriately as long as this flange is continuous with a tip of a peripheral wall and bent to project outwardly. As an example, a flange 34m shown in FIG. 7 that is tilted in a tapered pattern so as to expand further toward its tip in a direction of a fit is applicable. The flange 34m can reduce the amount of projection to the side, thereby allowing placement of the muffler 1 in smaller space. Further, the flange 34*m* can reduce air to collide with the flange 34*m*, thereby allowing reduction in air resistance under the floor.

Figure 8:
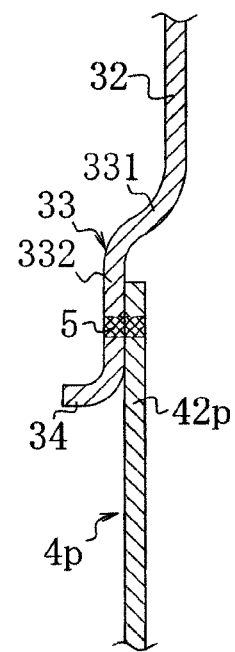
FIG. 8 is a partial sectional view showing parts fitting into each other and their vicinities of a shell in a muffler of another modification.

This invention includes an appropriate configuration for the second finished article such as the lower half body 4 where a portion including a tip formed by press molding is cut to provide a peripheral wall at an opening end portion. In addition to the lower half body 4 including the second flared part 43 of the aforementioned embodiment provided with the peripheral wall 432 formed by cutting the portion including the tip formed by press molding, this invention includes a lower half body 4*p* without a flared part shown in FIG. 8, for example. The lower half body 4*p* has a peripheral wall 42*p* extending continuously in a standing position from a peripheral edge of a substrate provided at an opening end portion by cutting a portion including a tip formed by press molding.

INDUSTRIAL APPLICABILITY

This invention is applicable to a muffler for an automobile and a step of manufacturing the muffler.

REFERENCE SIGNS LIST

1 Muffler
2 Shell
3 Upper half body
30*a*, 30*b* First semi-finished article
31 Substrate
32 Peripheral wall
33 First flared part
331 Jutting part
332 Peripheral wall
34, 34*m* Flange
34*a*, 34*b* Semi-finished flange
4, 4*p* Lower half body
40*a*, 40*b* Second semi-finished article
41 Substrate
42, 42*p* Peripheral wall
43, 43*b* Second flared part
431 Jutting part
432, 432*b* Peripheral wall
44*a*, 44*b* Semi-finished flange
45, 46 Through hole
5 Welded part
6 Inlet pipe
7 Outlet pipe
C1, C2 Cut

The invention claimed is:

1. A muffler having a shell formed by making a fit between respective opening end portions of metallic finished articles each having a peripheral wall extending in a standing position from a peripheral edge of a substrate and welding the finished articles, wherein the shell is characterized in that
 a flared part is provided at the opening end portion of a first finished article,
 a flange is provided at a tip of a peripheral wall extending substantially vertically and belonging to the flared part, the flange being bent to project outwardly,
 a peripheral wall is provided at the opening end portion of a second finished article by cutting a portion including a tip formed by press molding,
 the peripheral wall at the opening end portion of the second finished article is press fitted inside the peripheral wall of the flared part of the first finished article to fit into the peripheral wall of the flared part so as to extend substantially along the peripheral wall of the flared part, and
 a part of the peripheral wall of the flared part of the first finished article and a part of the peripheral wall at the opening end portion of the second finished article that fit into each other are laser welded along their entire peripheries.

2. The muffler according to claim 1, wherein
 the flared part provided to the first finished article is a first flared part,
 a second flared part is provided at the opening end portion of the second finished article, and
 the peripheral wall at the opening end portion of the second finished article forms a peripheral wall of the second flared part.

3. The muffler according to claim 1, wherein the first finished article is an upper half body and the second finished article is a lower half body.

4. The muffler according to claim 2, wherein the first finished article is an upper half body and the second finished article is a lower half body.

5. The muffler according to claim 1, wherein the flange is formed into a tapered pattern so as to expand further toward its tip in a direction of the fit.

6. The muffler according to claim 2, wherein the flange is formed into a tapered pattern so as to expand further toward its tip in a direction of the fit.

7. The muffler according to claim 3, wherein the flange is formed into a tapered pattern so as to expand further toward its tip in a direction of the fit.

8. The muffler according to claim 4, wherein the flange is formed into a tapered pattern so as to expand further toward its tip in a direction of the fit.

9. A method of manufacturing a muffler comprising:
 a first step of forming a metallic first finished article and a second finished article, the first finished article having a peripheral wall extending in a standing position from a peripheral edge of a substrate and a flared part and a flange provided at an opening end portion formed by performing at least press molding on a metallic plate, the flange projecting outwardly from a tip of a peripheral wall extending substantially vertically and belonging to the flared part, the second finished article having a peripheral wall extending in a standing position from a peripheral edge of a substrate and a peripheral wall tending to expand toward its tip and provided at an opening end portion formed by performing press molding on a metallic plate and cutting a portion including a tip formed by press molding;
 a second step of press fitting the peripheral wall tending to expand toward its tip and provided at the opening end portion of the second finished article inside the peripheral wall of the flared part of the first finished article, thereby making the peripheral wall tending to expand toward its tip fit into the peripheral wall of the flared part so as to extend substantially along the peripheral wall of the flared part; and
 a third step of laser welding a part of the peripheral wall of the flared part of the first finished article and a part of the peripheral wall tending to expand toward its tip and provided at the opening end portion of the second finished article that fit into each other along their entire peripheries, thereby forming a shell.

10. The method of manufacturing a muffler according to claim 9, wherein the first finished article formed in the first step has a first flared part corresponding to the flared part and the second finished article is formed in the first step by forming a second flared part having a peripheral wall tending to
expand toward its tip at the opening end portion.

\* \* \* \* \*